Aug. 30, 1938.   A. DUBONNET   2,128,694
ELASTIC SUSPENSION SYSTEM FOR VEHICLES
Filed March 27, 1936   3 Sheets-Sheet 1
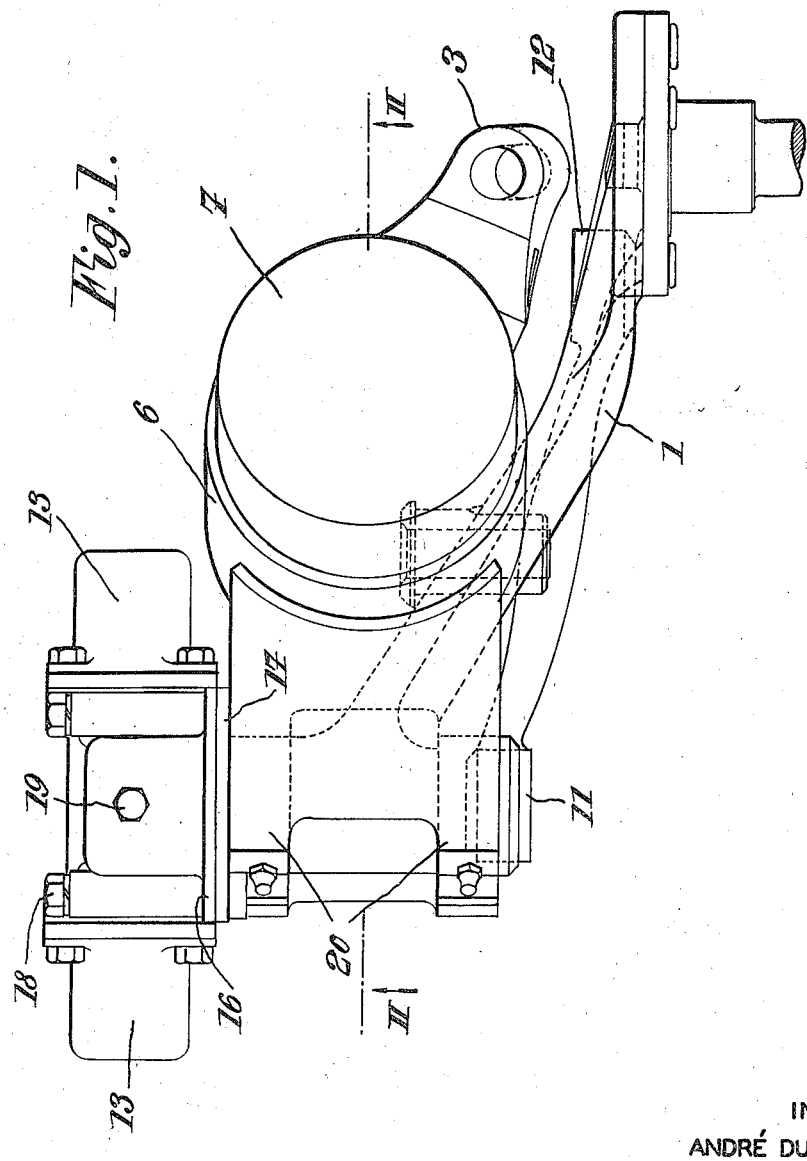
INVENTOR:
ANDRÉ DUBONNET
ATTORNEYS:

Aug. 30, 1938.  A. DUBONNET  2,128,694
ELASTIC SUSPENSION SYSTEM FOR VEHICLES
Filed March 27, 1936   3 Sheets-Sheet 2
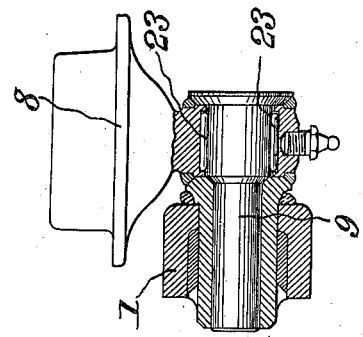
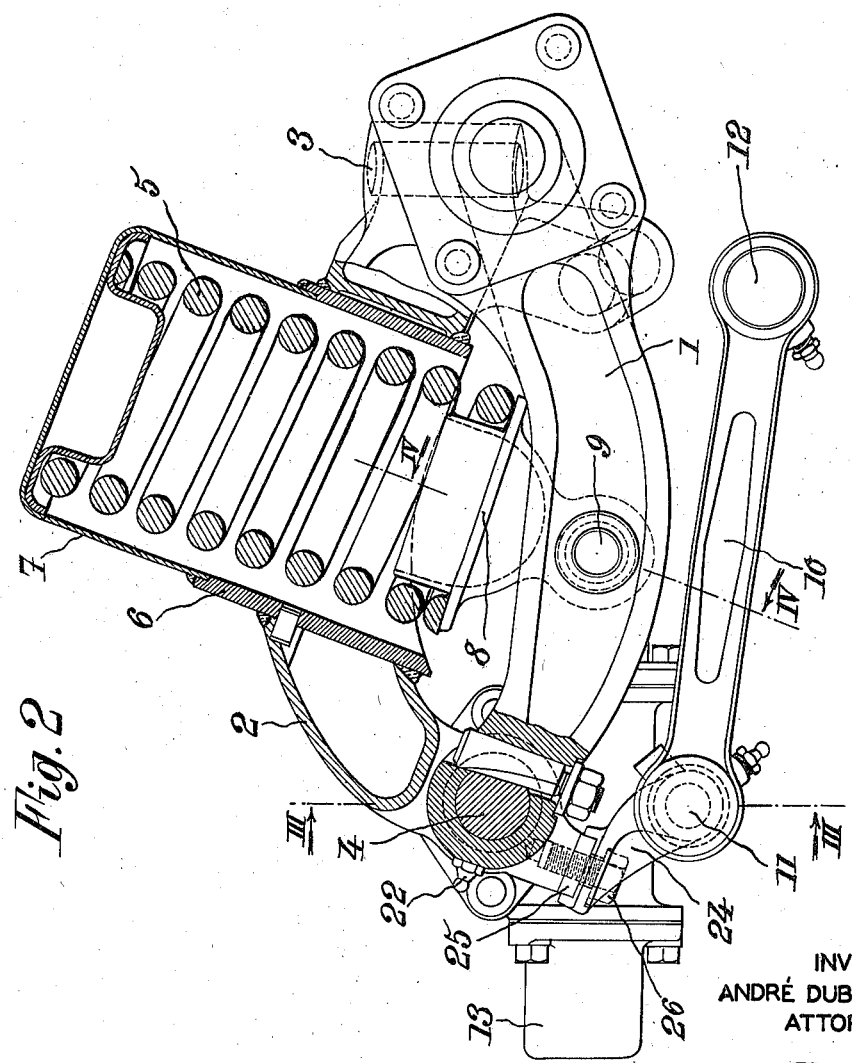
INVENTOR:
ANDRÉ DUBONNET
ATTORNEYS:

Aug. 30, 1938.    A. DUBONNET    2,128,694
ELASTIC SUSPENSION SYSTEM FOR VEHICLES
Filed March 27, 1936    3 Sheets-Sheet 3

INVENTOR
ANRÉ DUBONNET

ATTORNEYS:

Patented Aug. 30, 1938

2,128,694

UNITED STATES PATENT OFFICE 2,128,694

ELASTIC SUSPENSION SYSTEM FOR VEHICLES

André Dubonnet, Neuilly-sur-Seine, France

Application March 27, 1936, Serial No. 71,325
In Belgium March 11, 1936

12 Claims. (Cl. 267—20)

The present invention relates to elastic suspension systems for vehicles, either road vehicles or railway vehicles, of the independent wheel type in which each wheel is carried by an oscillating arm subjected to the action of suitable elastic means so as to balance the action of the weight of the vehicle, said arm being pivoted, about an axis substantially parallel to that of the wheel, either to the frame or a part rigid therewith, or, in the case of wheels capable of pivoting about a vertical axis for steering the vehicle, to a part connected to the frame of said vehicle in such manner as to be able to pivot with respect thereto about a substantially vertical axis.

The object of the present invention is to provide a suspension system of the type above referred to which is better adapted to meet the requirements of practice than suspensions of the same kind used up to the present time, and, especially, a suspension system simpler to manufacture and occupying as little space as possible.

The essential feature of the present invention, which is more especially, although not exclusively, applicable to the case of wheels adapted to pivot about a vertical axis, for steering purposes, resides in providing two arms one of which carries the wheel while the other is directly connected to the frame or other part carried by said frame, these two arms being of such a shape that at least a considerable part of the elastic means above referred to, and consisting for instance of a helical spring, can be interposed between these two arms.

According to another feature of the present invention, the suspension system includes a shock-absorbing device disposed on the outside of the elastic means and fitted in an easily removable manner, this device being preferably located close to the journal of the arm that carries the wheel, advantageously at one of the ends of this journal.

Still another feature of the present invention consists in pivotally mounting the oscillating arm that carries the wheel inside an envelope rigid with the support of said arm, so as to avoid torsional stresses on the journal.

Still another feature of the present invention consists in mounting said journal on needle bearings.

Still another feature of the present invention, concerning especially systems of the kind above referred to provided with a reaction rod interposed between the vehicle frame, or any other part supporting the oscillating arm, on the one hand, and, on the other hand, the fixed part of the vehicle brake, consists in pivotally mounting this rod, on the side of said frame or first mentioned part, in a piece which is readily removable.

Other features of the present invention will result from the following detailed description of a specific embodiment thereof.

A preferred embodiment of the present invention will be hereinafter described, with reference to the accompanying drawings, given merely by way of example, and in which:

Fig. 1 is a plan view of a suspension system according to the invention;

Fig. 2 is a sectional view on the line II—II of Fig. 1;

Fig. 4 is a sectional view of the line IV—IV of Fig. 2.

Figure 3:
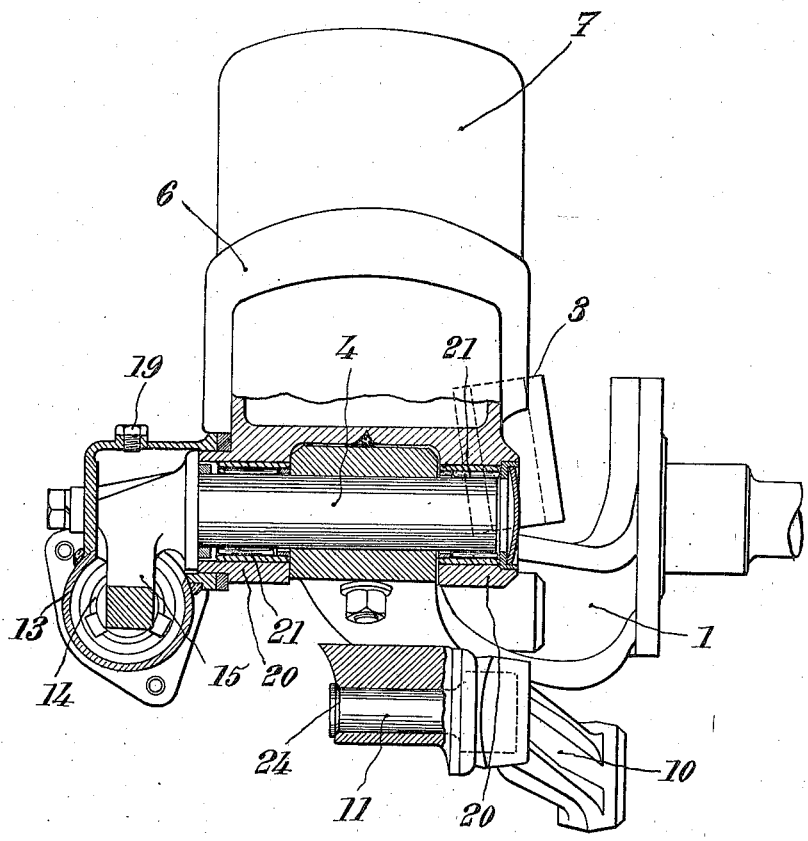
Fig. 3 is a sectional view on the line III—III of Fig. 2.

The specific embodiment illustrated by the drawings relates to a suspension system of the kind above referred to, that is to say of the oscillating arm type, for automobile vehicles.

The suspension system is devised in such manner that oscillating arm 1, which carries the wheel axle, is mounted, with a pivotal connection, on a second arm 2, which acts as a connection between the suspension system and the frame or body of the vehicle. In the case (which will be more specifically considered in the following) in which the wheel is adapted to pivot about a vertical axis, for steering purposes, the second mentioned arm, that is arm 2, is pivotally connected to the vehicle frame about a substantially vertical arm 3.

These two arms, pivoted to each other about an axis 4, are so shaped that it is possible to interpose between them at least a substantial part of the elastic means of the suspension, said means consisting advantageously of a helical spring visible at 5 in Fig. 2.

More specifically, as illustrated by the drawings, these two arms are provided, in elevation, with a curved shape, each of them having its concavity turned toward the adjacent arm, in such manner that, at the intermediate or mean position of the wheel, a sufficient interval is available in the vertical direction between these arms. If desirable, only one of the arms may be of curved shape.

It is possible, in this way, to obtain a suspension of reduced weight and which occupies a minimum space, since the whole system includes only two arms and a spring interposed between them, either wholly or partly. This spring may, for instance, bear, at its ends, against plates rigid with at least one of said arms or pivoted thereto.

For instance, as shown by the drawings, arm 2, which is preferably provided at the upper part of the system, may be devised in such manner that it carries, either integral therewith or rigidly fixed thereto through any suitable means, a cylinder 6 intended to house, at least partly, spring 5, said cylinder being advantageously provided with a removable end part 7.

Spring 5 bears, at one of its ends, against this end part 7, and, at its other end, upon a plate 8 preferably pivoted about an axis 9 to arm 1. The whole is arranged in such manner that the force exerted by the spring may, at all positions of the whole, pass substantially through said axis. I may also provide, on the side of the upper end of the cylinder, a pivoted piece against which the first mentioned end of the spring would bear. Of course, the system may include all necessary means for guiding the spring, especially means connecting said pivoted piece of plate 8.

Furthermore, said spring is given an average direction so that the spring can operate under the best possible conditions. For instance, this direction is substantially that of a tangent to the cylinder produced by the displacement of axis 9. I may further combine with the system above described any device of variable flexibility such as that already described in my prior patents.

Concerning now the shape in plan view, of said arms 1 and 2, said shape is such that the wheel axle is brought as close as possible to pivot 3, arms 1 and 2 being suitably bent for this purpose, for instance as shown by Fig. 1.

As it is visible on this figure, the whole of arm 2 and the elastic means is devised in such manner as to be located, at least substantially, behind a vertical plane passing through pivot 3. Arm 1, which is preferably connected to arm 2 as explained hereafter, is suitably curved, in plan view, in such manner as to have its free end close to pivot 3.

Advantageously, the system further includes a reaction rod 10 pivoted at 11 to arm 2 or a piece rigid therewith, and at 12 to the fixed part of the wheel brake.

The system is preferably completed by a shock absorbing device.

The system above described is simple, occupies but little space, which is especially important in the case of a suspension for an independent front wheel, and therefore constitutes a considerable improvement over prior systems of the same kind.

However, it is advantageous in connection with this system, to use the following supplementary arrangements which are capable of being used separately:

According to one of these supplementary features, the shock absorbing device above referred to is made independent of the elastic suspension proper, and it is fitted in such manner as to be readily removable.

The shock absorbing device itself may of course be devised in many different ways. For instance it may be of the friction type or of the hydraulic type, and, preferably, it is disposed on the pivoting spindle or journal 4 of the oscillating arm 1 that carries the wheel, preferably at the end of said journal.

By way of example, as shown by the drawings, I make use of a hydraulic shock absorber 13, of any conventional type including a single piston or a double piston 14 movable in two coaxial chambers. This device is arranged at the end of journal 4, in such manner that said piston 14 can be actuated by a lever 15 rigid with this journal, the latter being integral or rigid with arm 1 and mounted in suitable bearings or equivalent supports carried by arm 2.

The shock absorbing device may be mounted, for instance, by means of two plates 16 and 17 carried by said shock absorbing device and arm 2, respectively, the whole being fixed by means of bolts 18.

The advantage of such an arrangement is obvious. First of all, it will be possible to adapt any type of shock absorber to the suspension system. Furthermore this shock absorber is within easy reach (for instance for filling it with liquid at 19). It will be easy to take it apart, especially when the suspension system is mounted at the front of pivot 3, as shown by the drawings. The shock absorber is preferably disposed on the inner side of the frame relative to journal 4, although it may be arranged in any other suitable fashion.

According to another feature of the present invention, journal 4 and the end of arm 1 adjoining said journal is housed between the branches of a fork-shaped part 20 carried by the corresponding end of arm 2, preferably with the interposition of needle bearings 21.

I thus avoid the considerable torsional stresses to which journal 4 is subjected when the oscillating arm 1 is mounted at the end of this journal. Furthermore the bearings can easily be reached, especially for lubrication through 22.

I may also provide needle bearings 23 interposed in the articulation of plate 8 about axis 9, said axis consisting either of a fixed spindle integral with arm 1, as shown, or of a pivot rigid with the plate.

According to still another feature of the present invention, the pivot 11 of the reaction rod 10 is carried by a piece 24 fixed in a removable manner to arm 2. It may be secured for instance to projections 25 of fork-shaped member 20. This arrangement facilitates removal of rod 10, without requiring that articulation 11 be taken apart.

Thus the device is very simple. All its parts can be reached without difficulty, and taken apart.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a vehicle provided with a frame and at least one member such as a wheel, a suspension system which comprises, in combination, two arms pivoted to each other about a substantially horizontal axis, one of said arms having an element connected to said frame, the other arm having an element carrying said wheel, and elastic means for keeping said arms in a predetermined position of rest against the action of the weight transmitted by the vehicle to the wheel through the suspension system, at least a substantial portion of said means extending between said arms, said arms being shaped to accommodate said portion, said means being secured to said first arm intermediate said first element and said pivot, and to said second arm intermediate said second element and said pivot, said means exerting a force transversely relative to said arms.

2. In a vehicle provided with a frame and at least one member such as a wheel, a suspension system which comprises, in combination, two arms pivoted to each other about a substantially horizontal axis, one of said arms having an element connected to said frame, the other arm having an element carrying said wheel, at least one of said arms being of bent shape in vertical projection, with its concavity turned toward the other arm and elastic means for keeping said arms in a predetermined position of rest against the action of the weight transmitted by the vehicle to the wheel through the suspension system, at least a substantial portion of said elastic means extending between said arms said means being secured to said first arm intermediate said first element and said pivot, and to said second arm intermediate said second element and said pivot, said means exerting a force transversely relative to said arm.

3. In a vehicle provided with a frame and at least one member such as a wheel, a suspension system which comprises, in combination, two arms pivoted relative to each other about a substantially horizontal axis, one of said arms being connected to said frame, the other arm carrying said wheel, said arms being of bent shape in vertical projection with their concavities turned toward each other, a cylinder carried by one of said arms, and a helically wound spiral spring in said cylinder interposed between these two arms for keeping them in a predetermined relative position of rest against the action of the weight transmitted to the wheel by the vehicle through the suspension system, at least a substantial portion of said spring extending between said arms.

4. In a vehicle provided with a frame and at least one member such as a wheel, a suspension system which comprises, in combination, two arms pivoted relative to each other about a substantially horizontal axis, one of said arms being connected to said frame, the other arm carrying said wheel, said arms being of bent shape in vertical projection with their concavities turned toward each other, a cylinder carried by one of said arms, a plate pivoted to the other arm opposite said cylinder, and a helically wound spiral spring bearing at one end against said plate and at the other end against the outer end of said cylinder so as to keep said arms in a predetermined position of rest against the action of the weight transmitted to the wheel by the vehicle through the suspension system, at least a substantial portion of said spring extending between said arms.

5. In a vehicle provided with a frame and at least one member such as a wheel, a suspension system which comprises, in combination, two arms, one of said arms being connected to said frame, the other arm carrying said wheel, a spindle carried by one of said arms, and a fork-shaped tubular part carried by the other arm engaging said spindle so as to connect said arms pivotally together about a substantially horizontal axis, at least one of said arms being of bent shape in vertical projection, with its concavity turned toward the other arm, and elastic means for keeping said arms in a predetermined relative position of rest against the action of the weight of the vehicle transmitted to said wheel through the suspension system, at least a substantial portion of said elastic means extending between said arms.

6. A suspension system according to claim 5 further including needle bearings between said spindle and the tubular parts of said fork-shaped member.

7. In a vehicle provided with a frame and at least one member such as a wheel, with a brake for said wheel having a fixed part, a suspension system which comprises, in combination, two arms pivoted relative to each other about a substantially horizontal axis, one of said arms being connected to said frame, the other arm carrying said wheel, at least one of said arms being of bent shape in vertical projection with its concavity turned toward the other arm, elastic means for keeping said arms in a predetermined relative position of rest against the action of the weight transmitted by the vehicle to the wheel through the suspension system, at least a substantial portion of said elastic means extending between said arms, an element removably secured to said first arm, and a reaction rod pivoted at one end to the fixed part of the wheel brake and at the other end to said element.

8. In a vehicle provided with a frame and at least one member such as a wheel, a suspension system which comprises, in combination, two arms pivoted to each other about a substantially horizontal axis, one of said arms having an element connected to said frame, the other arm having an element carrying said wheel, and elastic means for keeping said arms in a predetermined position of rest against the action of the weight transmitted by the vehicle to the wheel through the suspension system, at least a substantial portion of said means extending between said arms, said arms being shaped to accommodate said portion, said means being secured to said first arm intermediate said first element and said pivot, said means being pivotally connected to said second arm at a point intermediate said second element and said pivot, said means exerting a force in a direction substantially tangential to the arc of movement of said point about said pivot.

9. In a vehicle provided with a frame and at least one member such as a wheel, with a brake for said wheel having a fixed part, a suspension system which comprises, in combination, two arms pivoted relative to each other about a substantially horizontal axis, one of said arms being connected to said frame, the other arm carrying said wheel, elastic means for keeping said arms in a predetermined relative position of rest against the action of the weight transmitted by the vehicle to the wheel through the suspension system, an element removably secured to said first arm, and a reaction rod pivoted at one end to the fixed part of the wheel brake and at the other end to said element.

10. In a vehicle provided with a frame and at least one member such as a wheel, a suspension system which comprises, in combination, two arms, the first of which is pivoted about a substantially vertical axis to said frame and the second is connected to said wheel, a spindle secured to said second arm, and a fork-shaped tubular part secured to said first arm adapted to engage said spindle so as to connect said arms pivotally together about a substantially horizontal axis, a shock absorber secured to one of the outer faces of said fork-shaped tubular part and actuated by said spindle and elastic means for keeping said arms in a predetermined relative position of rest against the action of the weight of the vehicle transmitted to said wheel through the suspension system.

11. A suspension system according to claim 10, in which said shock absorbing device is secured to said fork-shaped tubular part in a readily removable manner.

12. In a vehicle provided with a frame and at least one member such as a wheel, a suspension system which comprises, in combination, two arms, the first of which has an element pivoted to said frame about a substantially vertical axis, the other arm having an element carrying said wheel, a spindle secured to said second arm, and a fork-shaped tubular part secured to said first arm adapted to engage said spindle so as to connect said arms pivotally together about a substantially horizontal axis, and elastic means for keeping said arms in a predetermined relative position of rest against the action of the weight of the vehicle transmitted to said wheel through the suspension system, said means being secured to said first arm intermediate said first element and said fork-shaped tubular part, and to said second arm intermediate said second element and said spindle, said means exerting a force transversely relative to said arm.

ANDRÉ DUBONNET.